United States Patent [19]

Hastings et al.

[11] Patent Number: 5,344,696
[45] Date of Patent: Sep. 6, 1994

[54] ELECTRICALLY CONDUCTIVE LAMINATE FOR TEMPERATURE CONTROL OF AIRCRAFT SURFACE

[76] Inventors: Otis H. Hastings; Otis M. Hastings, both of 130 E. Crescent Ave., Mahwah, N.J. 07430

[21] Appl. No.: 849,935

[22] Filed: Mar. 12, 1992

Related U.S. Application Data

[63] Continuation of Ser. No. 469,288, Jan. 24, 1990, abandoned.

[51] Int. Cl.⁵ .................... B64D 15/16; B32S 5/00
[52] U.S. Cl. .................... 428/220; 428/212; 428/213; 428/246; 428/332; 428/336; 428/373; 428/374; 428/408; 428/418; 428/902; 428/926; 219/529; 219/548; 244/134 D; 427/318; 427/446
[58] Field of Search .............. 244/134 D; 219/548, 219/529, 548; 338/306; 428/389, 212, 13, 220, 246, 373, 4, 408, 332, 336, 418, 902, 926; 294/134; 427/318, 446

[56] References Cited

U.S. PATENT DOCUMENTS

| | | | |
|---|---|---|---|
| 4,021,008 | 5/1977 | Eichenauer | 244/134 D |
| 4,737,618 | 4/1988 | Barbier et al. | 219/548 |
| 4,808,481 | 2/1989 | Luxon | 428/407 |
| 4,942,078 | 7/1990 | Newman et al. | 428/192 |
| 4,972,197 | 11/1990 | McCauley et al. | 343/704 |
| 5,248,116 | 10/1993 | Rauckhorst | 244/134 A |

*Primary Examiner*—Patrick J. Ryan
*Assistant Examiner*—Richard C. Weisberger
*Attorney, Agent, or Firm*—W. Patrick Quast

[57] ABSTRACT

A laminate coating comprising a durable outer ply which is resistant to abrasion and impermeable to water, bonded to and through a conductive layer of fibers and an integrally enveloping adhesive layer which is disposed on a vehicle component surface, such that the laminate coating upon curing is bonded to the vehicle component surface such as the surface of an aircraft part especially the fuselage, wing parts or tail section. The conductive layer is connected to a source of electrical energy and control means adapted to control the temperature of the coated surface of the aircraft part.

25 Claims, 5 Drawing Sheets

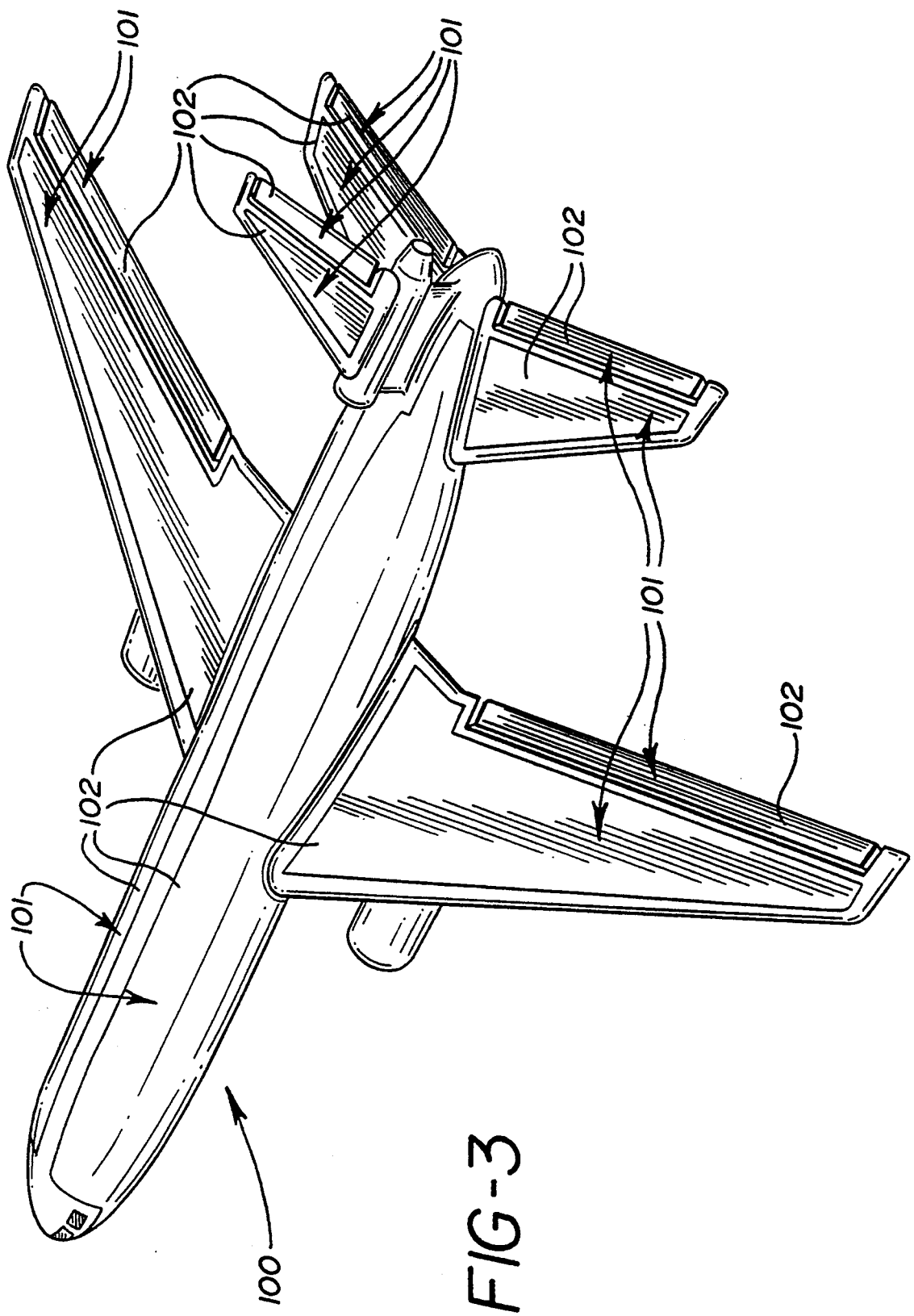

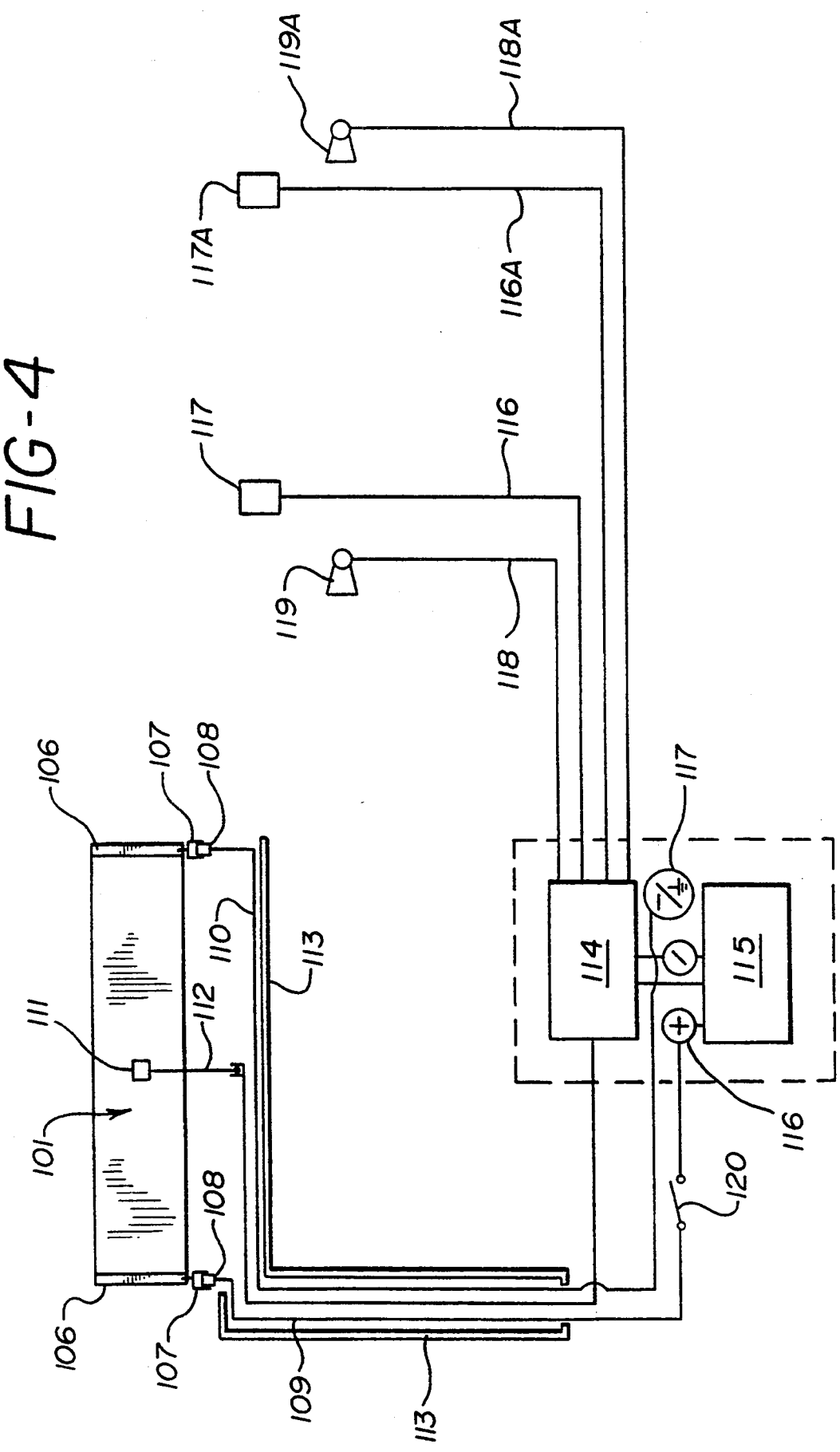

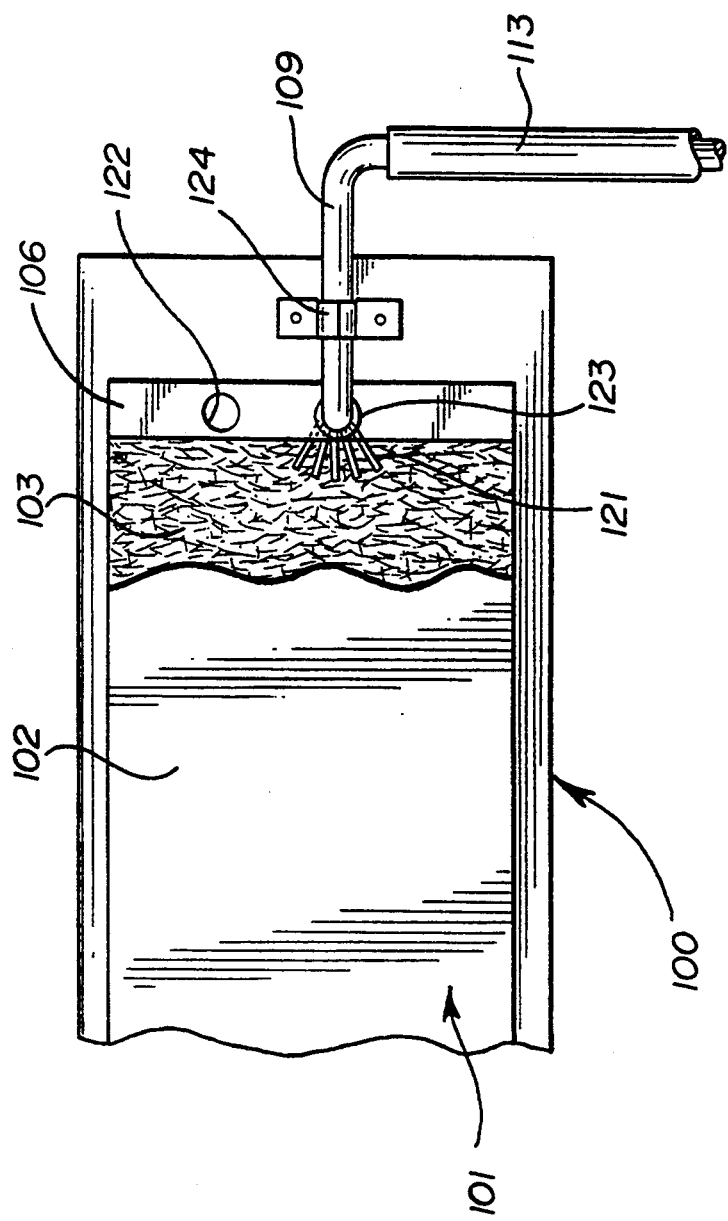

ELECTRICALLY CONDUCTIVE LAMINATE FOR TEMPERATURE CONTROL OF AIRCRAFT SURFACE

This is a continuation of application Ser. No. 07/469,288, filed Jan. 24, 1990, now abandoned.

BACKGROUND OF THE INVENTION

Aircraft are exposed to a variety of temperature conditions during flight and while out of service on the ground. Fuel, when tanked in areas directly adjoining exterior surfaces of the aircraft may change the temperature of those surfaces without warning. In the event the surface temperature or the aircraft falls below 32° F. and there is mist, rain or high humidity in the ambient air; ice can form in thin films on these surfaces. If undetected, this ice can dislodge during operation of the aircraft and fly into other portions of the aircraft especially into engine parts, causing damage that may affect the performance of the aircraft and if severe, can completely stop engine operation. Aircraft which have wing fuel tanks with jet engines mounted behind the wings are especially prone to what is termed "ICE FOD" or "ice foreign object engine damage". In addition, aircraft taxiing behind aircraft with ice build-up may be exposed to showers of ice as the former aircraft begins take-off. In addition, sensors and control surfaces may become fouled with ice resulting in inaccurate readings and unreliable control during flight.

The magnitude of the problem was reported by the U.S. Department of Transportation Federal Aviation Administration in General Aviation Airworthiness Alert Special Issue AC No. 43-16. In this report, 516 known ice related accidents occurred from April 1976 to April 1987 with 567 fatalities. In this report certain aircraft were found to be more prone to ice formation than others. The recommendation of the report is as follows:

RECOMMENDATION

It is recommended that all owners and operators of airplanes listed in the Applicability list exercise extreme caution when planning a flight in areas where icing is known or forecast to exist. A special review of each individual airplane's records should be conducted to clarify the icing flight approach status of any anti-ice/de-ice equipment that is installed on the airplane, and flight into any kind of known icing environment made only when all of the equipment required for flight in that particular environment is "installed and approved."

Methods to detect ice build-up on aircraft have been confined to visible observations aided by decals and movable tufts of material which will become fixed by the layer of ice. The removal of ice has been accomplished by using expensive trucks and crews which spray de-icing agents on the aircraft. This is only a temporary solution to the problems since delays in take-off can lead to a reaccumulation of the ice film before departure. Some aircraft have been equipped with heat manifolded from engines out to the leading edge of the wings that do not heat the wings adequately to remove surface ice. Heating pads of various types have been bonded to the surface of wings but are prone to detachment under extreme conditions of temperature, vibration and wind shear Raid have not been found to be safe or effective. It would advance the safety of air travel if a device were developed to sense conditions of surface temperatures at which ice would develop and rapidly heat these surfaces to prevent and/or melt ice accumulations which is integrally bonded onto the surface of the aircraft. It is also contemplated that the same technology can be applied to other types of vehicles and vehicle components which require ice melting or removal for safe and efficient operations. For example, movable components on ships such as gun turrets and the hoods of cars and trucks could be similarly protected.

Therefore, it is an object of this invention to provide a means to detect temperature conditions on aircraft surfaces during which ice can accumulate (i.e. approximately 32° F. or less) and to provide a means to heat these surfaces to temperatures sufficient to prevent and/or melt said ice rapidly prior to take-off. It is a further object of this invention to integrally bond a means of warming aircraft parts to that aircraft part.

Heating elements or systems developed for other applications are not adaptable to heat the surfaces of aircraft especially exterior surfaces.

Invention Disclosure Statement per 37.CFR 1.97 et seq.

In U.S. Pat. No. 4,250,397, Gray described a paper impregnated with graphite fiber and saturated with a binder to adhere the top and bottom sheets to the saturated fiber matrix. Two segments of the paper are connected in series and encapsulated between cover sheets to form the heating element of a drapable heating pad. This invention doesn't teach the integral bonding of a conductive ply to a surface or the use of metal coated fibers as a conductive ply.

In U.S. Pat. No. 3,923,697, Ellis described an electrically conductive composite comprising graphite, magnesium dioxide and zinc oxide for use on a substrate in electrically conductive coatings. This coating is not integrated into a laminate on application to a surface.

In U.S. Pat. No. 3,935,422, Barnes and Sharpe described an electrically conductive mixture comprising vinylidene chloride polymer and carbon forming a woven glass fabric with a vapor barrier attached thereto. The amount of conductive material is varied to provide variation in the watt density of heat provided. The device can be glued to plaster board. This invention teaches that the density of the material must be varied in order to obtain changes in heat energy on a surface area.

In U.S. Pat. No. 3,900,654, Stinger described an electric heating element comprising a layer of electrically conductive elastomer containing carbon black dispersed in a fluorocarbon elastomer attached to an insulator. The elastomer must be heated under pressure until it bonds to the insulator. This invention teaches that a conductive ply can be bonded to an insulator with heat and pressure, conditions that cannot be used in the current invention.

In U.S. Pat. No. 3,839,134, Fujihara described a non-metallic web of carbon particles and non-metallic fibers coated with plastic for use as a heat generating sheet. This plastic coated conductive sheet is not bondable in the method described for the current invention.

In U.S. Pat. No. 3,749,886, Michaelsen described a flexible conductive sheet including conductive particles in a matrix and channel-shaped electrodes covered by a flexible insulating envelope. This device is not applicable for lamination to a surface.

In U.S. Pat. No. 3,657,516, Fujihara described a panel heating unit comprising an electrically resistive paper or porous material sealed in paper or cloth with a resin. This panel is a relatively thick self-contained heating unit intended to fit into a wall or ceiling system and is not adaptable to heating a vehicle surface.

In U.S. Pat. No. 3,859,504, Kureha and Toyo described a panel heater comprising a sheet of carbon fiber paper with electrodes at each end and a layer of synthetic resin covered by aluminum foil which is coated by a synthetic resin. This panel is also a relatively thin self-contained heating unit intended to fit into a panel system.

LIST OF DRAWINGS

FIG. 3 is an illustration of the invention used in various portions of an aircraft.

FIG. 4 is a logic diagram illustrating the control and power systems most desirably used to operate the invention.

FIG. 5 is a close-up view of the conductive bus at the edge of the laminate to an aircraft part 100 showing a soldered wire junction.

SUMMARY OF INVENTION

Figure 1:
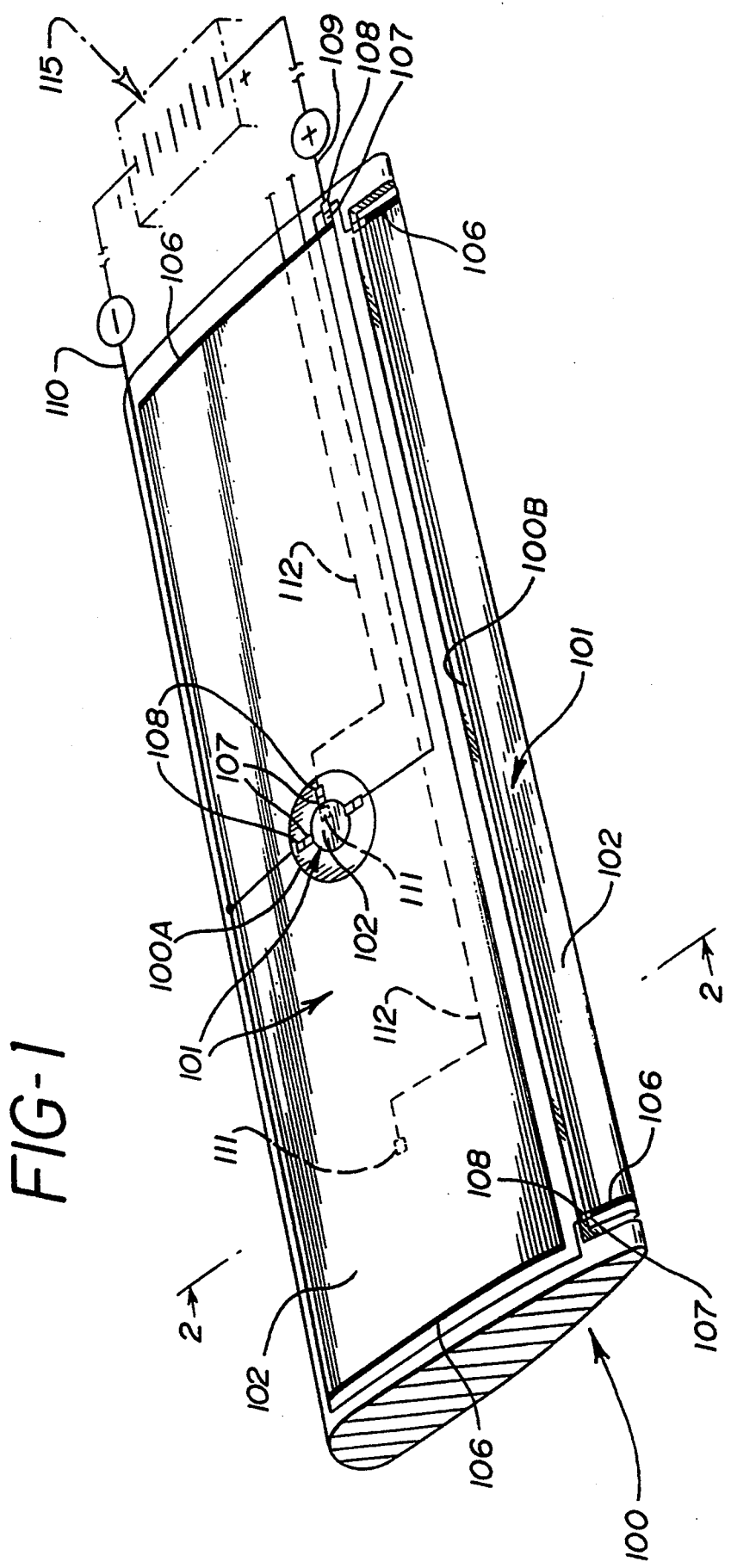
FIG. 1 is a perspective view of the laminate 101, applied to an aircraft wing 100.

This invention discloses a unique, integrally bonded laminate which is used to thermally control a surface or a portion of a surface of an aircraft to which the laminate is bonded. The composite is an integrally bonded laminate comprising an outer ply which seals the interior of the laminate against penetration and water damage. It is most desirably a two component polyurethane top coating with adhesive properties which can bond to the electrically conductive ply and through the lattice work in that ply to bond comparably with the underlying adhesive.

The next ply is comprised of substrate fibers which may be woven or non-woven, chopped or non-chopped non-woven materials or woven in continuous plies. The substrate may be graphite, ceramic fiber, aramid, polyester and other such substrates. A metal coating is a good conductor of electrical energy and can include copper, silver, nickle, gold and other similar metals and alloys. The fibers may be metallized individually and formed into the ply or the metallization can occur after the ply has been formed. In a significantly preferred embodiment the fibers are nickle coated graphite which are non-woven fibers manufactured from chopped fibers with a diameter of 8 microns with a range of 4 to 100 microns and length of 2.5 centimeters with a range of 0.5 to 5 centimeters; percent composition 50% carbon and 50% nickel by weight with a range of 5 to 95% of each component respectively.

The conductive ply has a surface resistivity of less than one ohm per square in the fabric form with a range of 500 to 0.1 ohms per unit square. This electrically conductive ply can be used to selectively control the temperature of a surface to which it is applied by connecting it to a source or electrical energy. The amount of current can be varied using a control system. The temperature of the surface can be measured by a sensor and can be varied as required for the application of the invention. Temperature sensors can also be bonded in the laminate. The amount of current can be varied in response to the outer surface temperature using a logic system such as a microprocessor. The edges of the conductive ply are connected to the source of power using all edge connector or bus bar and wiring system. The conductive ply is then bonded to the surface of the panel to be protected using an adhesive which will maintain its bonding capability over a wide range of temperatures. In a preferred embodiment of the invention, the adhesive is a one part epoxy coating. Due to the porous nature of the conductive layer the outer ply is intermittently bonded to the adhesive ply thereby integrally enveloping the electrically conductive ply.

An important application of this invention is the application of the laminate to the wings and fuselage of aircraft. The exterior surface of aircraft can form layers of ice on the wings and fuselages. This layer of ice can affect the operation of controls and sensors as well as shear off and damage other parts of the aircraft especially the engines as described hereinabove.

This invention can be used on aircraft parts to permit controlled heating of certain surfaces, especially the wings. The rate of heating can be controlled to rapidly heat and efficiently prevent and/or melt ice from these surfaces. The electrically conductive layer can be die cut to facilitate coating the irregular shapes and to surround inspection plates and control surfaces. The latter removable and movable surfaces can also be treated with the laminate, using precisely cut pieces of the electrically conductive ply bonded to these surfaces. A pliable wiring and bus arrangement connects the electrically conductive plies of these removable/movable components to the main grid. Also, electrical connectors call be employed to facilitate rapid removal of these elements.

In order to add further strength and in some embodiments to insulate the laminate from the surface of the part, a resilient/insulating ply of material can be added if desired, to enhance the strength of the laminate. The resilient/insulating ply call be added on one or on both sides of the electrically conductive ply if desired. The material should be porous or a lattice of fibers to permit integral bonding of the components of the laminate. (Examples of materials that could be employed include aramid and similar inert, structurally strong materials. The adhesive is added on either side of the resilient/insulating ply to facilitate integral bonding of the plies.

DESCRIPTION OF THE INVENTION

The laminate 101 is applied to surfaces 100 of the aircraft, especially the wings as shown in FIG. 1 but also may be applied to the fuselage and tail surfaces as shown in FIG. 3. It can be applied over flat or curved surfaces and also can be used on movable and removable structures as shown for the inspection plate 100A and flap 100B in FIG. 1.

Figure 2:
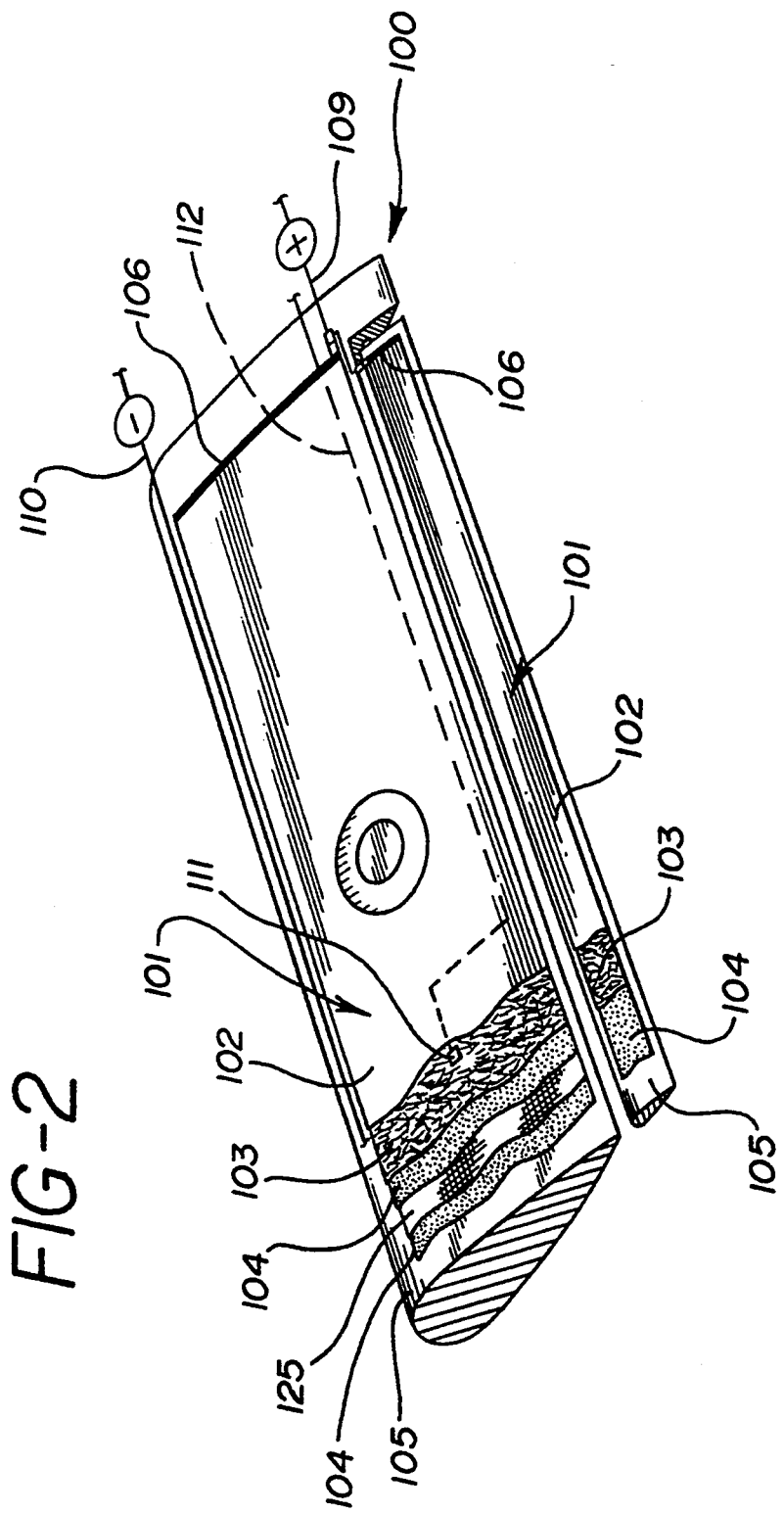
FIG. 2 is a perspective partially broken cross section of FIG. 1 along line 2—2.

The laminate 101 can be applied to the upper and lower surfaces of wings as shown in FIG. 2. The laminate is comprised of a plurality of integrally bonded piles. The outer ply of the laminate is waterproof, resistant to abrasion and penetration and hard when cured. In a preferred embodiment the outer ply 102 is a polyurethane top coating with adhesive properties that is applied to the electrically conductive ply 103. The preferred polyurethane coating is a two component coating comprising a polyurethane base mixed in equal volumes with a polyurethane curing solution, such as that manufactured by Crown Metro Aerospace Coatings, Inc. of Greenville, S.C. 24-72 Series which is compatible to bond with the preferred epoxy coating for the adhesive ply 104 as described herebelow. Said outer ply can be spray applied and a dry film with thickness of 0.002±0.0005 inches thick results after 9 hours at room temperature. Use of different thinners can affect drying time and electrostatic properties. The cured coating 102 in the preferred embodiment is a two component chemically cured polyurethane topcoat designed to provide outstanding resistance to weathering with maximum gloss and color retention. This quality coating is a carefully balanced formulation that will give maximum chemical resistance coupled with sufficient flexibility, is water impermeable and is capable of approximately 30% elongation, to minimize chipping, flaking and erosion. This topcoat is available in all color and gloss ranges including clears and metallics.

The electrically conductive ply 103 is comprised of a lattice work of conductive fibers which are metallically coated substrate fibers. The metallic coating can be applied individually to the substrate members or to a ply comprised of said substrate fibers. The substrate fibers may be made of graphite ceramic fiber, polyaramid polyester and the like. These substrate fibers may be chopped or not chopped to an average length. The chopped or unchopped fibers may be used either in a woven or non-woven ply form. The fibers may range in diameter from 4 to 100 microns and in length from 0.5 to continuous form. The surface resistivity of the ply can range from 500 to 0.1 ohm per unit square. The metallic coating on the substrate is a good conductor or electrical energy including copper, silver, aluminum, nickle, gold or other similar metals and alloys.

In a significantly preferred embodiment, the substrate is graphite fibers which are chopped, non-woven fibers with an average diameter of 12 microns and an average length of one inch. The metallic coating is nickle applied such that the average weight of the electrically conductive ply 103 is 50% graphic and 50% nickle and the surface resistivity of this ply is less than one ohm per square. The electrical conductive ply 103 is a very thin sheet of a gauze-like web of fibers, having mechanical properties similar to tissue paper and transparent to light. A nominal thickness of such a ply of nickel coated fibers, used in the preferred embodiment is on the order of 0.003 inches. The conductive ply of the preferred embodiment would have a nominal weight of 0.3 ounces per square yard. A typical sheet of such material is available from VERATEC, a division of International Paper Co., located in Walpole, Mass. Their non-woven mat consisting of nickel coated carbon fibers is marketed as Grade Number 8000855. Its surface resistivity is nominally 1.3 ohms per unit square. The electrically conductive ply 103 is connected to a source of electrical energy, using a connecting edge bus and wiring system. The electrical energy may be provided as direct current or alternating current.

The edge bus 106 is bonded directly to the electrically conductive ply 103 and has an electrical connector 107 other suitable wire interface as described hereinbelow which joins to complimentary connector 108 which is joined to an electrical conducutor 109 and 110. In one embodiment, the opposite edges of the electrically conductive ply 103 are connected to opposing poles of direct or alternating electrical source 115 with conductor 109 being connected to the positive pole and 110 being connected to the negative pole of the power source. The electrically conductive ply 103 is then bonded to the surface 105 of the aircraft component using an adhesive ply 104. The conductive ply can be readily die cut prior to lamination in the composite to facilitate covering a variety of shapes and sizes of component parts. The adhesive ply 104 should maintain a strong bond between the laminate 101 and the surface of the component 105 as shown in FIG. 2 over a wide range of temperature and humidity conditions. In a preferred embodiment of the invention in which the aircraft part is metallic, the adhesive is a one part epoxy coating which is aluminized and chemically cured. It has the following characteristics:

Admixed Viscosity—(#2 Zahn) 19 Sec±2
Grind Fine—5 min.
V.O.C. Admixed 641 gr/liter
Recommended film thickness—0.8 to 1.2 mil A typical epoxy, as mentioned above but not limited to, such as 10-P1-3 Aluminized Epoxy Coating, Chemical Resistant as manufactured by Crown Metro Aerospace Coatings, Inc. Greenville, N.C.

All aluminum surfaces to be treated by the epoxy primer coating must be anodized, chromate conversion coated or primed before application thereto. In the event that the aircraft part to be coated is fiberglass or other non-metallic surfaces, then a compatible adhesive with similar performance properties to the above referenced metallic adhesive can be used in the practice of the invention.

In some embodiments of the invention one or more resilient/insulating plies 125 may be incorporated into the laminate. In most embodiments, the ply will be added between the electrically conductive ply and the surface of the panel. In this event, the adhesive ply will be duplicated on either side of the resilient/insulating ply 125. The resilient/insulating ply is desirably a network of non-conductive fibers which may be either woven or non-woven; chopped or non-chopped fibers which may be non-woven or woven in continuous plies. The thickness of the ply may range from 10 to 100 microns with an average of 30 microns in a preferred embodiment. The fibers may be aramid polyester, ceramic fiber and other similar inert materials with good electrical and heat insulating properties. This ply is porous to permit integral bonding of the adhesive 104 from the thermal conductive ply 103 to the surface 105 of the part being treated with the laminate 101.

In order to provide a means to assess the amount of heat generated on the aircraft part 100 treated by the laminate 101, a means of measuring surface temperature at one or more areas in the laminate 101 is desirable. In a preferred embodiment of the invention, a bondable foil thermocouple 111 as shown in FIG. 1 may be incorporated in the laminate and a thermocouple control wire 112 can be routed with the electrical wires to the control system. In the event the laminate 101 is applied to a removable 100A or movable 100B aircraft part, an electrical connector 107 may be used on the thermocouple lead wire compatible with a second connector 108 applied to the control wire. The thermocouple sensor is ideally thin and flat and can sense temperatures up to 150° C. A Chromel-Alumel Foil thermocouple Style I as manufactured by Omega Engineering, Inc., Stamford, Conn., 0.0005 inches thick with an 0.010 inch diamter control wire has a rapid response to temperature change and is readily employed in the laminate. It may be installed, exterior to or interior to, the conductive ply 103. Alternatively, other temperature sensors such as a 3 wire RTD can be used but these systems are sensitive to vibration and shock. Thermocouples can develop age related errors and thermocouples can exhibit non-linear temperature responses over wide temperature ranges.

Thermisters are manufactured front a mixture of metal oxides sealed in glass or epoxy. These sensors require precise individual calibrations and are error prone at high temperatures. However, thermistors tend to become more s table with time and are highly accurate at the design temperature range.

Control of temperature may be accomplished by having a varied amount of current delivered over either a fixed or varied amount of time or by providing a constant amount of current for a series of fixed intervals or time. In the event a fixed energy level with time variations chosen, a wide range of target temperatures should be selected to eliminate oscilating on-off current or "chatter" in the power circuit. In the current invention, if a fixed current with variable time application is chosen for control, the minimum activation temperature should be several degrees above 32° F. and shut off temperature should be below temperatures at which components or the aircraft part or any associated fuel or lubricants would be damaged or ignited. In general, less than 200° F. would be a safe stop point. An automatic reset may be added based upon known performance of the system to slop heating to avoid exceeding the maximum temperature. The use or the system requires prior testing of the size grid being heated to establish the automatic reset point.

In a current proportional system, the voltage can be varied in response to the temperature measured versus the temperature desired on the grid. Direct current voltage can be applied in a range from 8 volts to up to 32 volts to heat the grid. If alternating current is used, 8 to 220 volts could be applied to the grid at 50 to 400 cycles per second. A programmable microprocessor based controller could be used to establish voltages to be applied depending upon the surface temperature of the grid prior to heating.

Alternatively, a control system could be provided to simply heat the grid on a pre-programmed basis without sensor feedback. A manual over-ride switch could be used to terminate the current if safe temperatures are exceeded. The latter system is significantly less preferred due to the potential danger of over heating the part.

In any event, an alarm logic loop incorporated into the temperature measurement circuit is present in a preferred embodiment of the invention with alarm limits for low temperature at 32° F. and high at approximately 200° F. with a temperature read-out in the aircraft cockpit as well as provision for an alarm and temperature signal access to the ground crew. A manual over-ride to disable or enable the healing circuit is also provided in a significantly preferred embodiment of the invention. The power and temperature control system may be contained in the aircraft or alternatively be housed in ground support equipment and "plugged in" to the aircraft during preparation for departure. The latter alternative may be more cost effective but is less preferred because the ground crew must be available if a second de-icing is needed prior to take-off. In a preferred embodiment, the aircraft is equipped with a control and heating system with a ground back-up unit available on an emergency basis in the event of failure or the in-board unit.

A preferred embodiment of the control system and heat source is shown in FIG. 4. The laminate 101 is connected to the power source 115 housed in the control/power system 110. The edge bus 106 is a layer of copper foil in a preferred embodiment of the invention which is approximately 0.5 inches in width and 0.0005 inches thick. It may be a continuous strip or contain perforated or fenstrations if desired. It is desirably fastened to opposing edges of the conductive ply 103 when it is embedded into the still wet adhesive ply 104. Thus, the bus is integrally bonded as a portion of the laminate. The electrical connector 107 joined to the bus 106 is attached to a complimentary connector 108 which is connected to an electrical conductor 109 which runs in a sheltered area or the aircraft preferrably covered by a water-tight conduit 113. One edge of the laminate 101 is joined to the positive pole 116 of a source of electrical energy 115. The bus at the opposite edge of the laminate 101 is connected to a negative or ground pole 117 of the source of electrical energy 115. At least one temperature sensor 111 is laminated into the component 101 and connected to the control wire 112 which terminates in the control unit 114, passing through a conduit 113. The control unit 114 is most desirably a microprocessor programmed to display the temperature of the aircraft surface to displays 117 and 117A. The control unit 114 is desirably programmed to activate alarms 119 and 119A in the event the temperature falls below 32° F. or exceeds 200° F. or other temperatures found to be critical to the safe operation of the aircraft. In a preferred embodiment temperature display and alarm 117 and 119 respectfully would be in the cockpit of the aircraft connected to the control unit 114 by control wires 116 and 118 respectively while the respective element designated "A" would be duplicated for the ground crew while the aircraft is not in service. A manual over-ride switch 120 can disable the power circuit to the laminate 101 to prevent over-heating in the event of control error.

In an alternative variation of bus bar 106 connection to the electrical connector 109, the use of a plug type connector is eliminated and the conductor 109 is attached directly to the bus 106 as shown in FIG. 5. The electrical conductor 109 has its end stripped of insulation revealing a bare conductor 121. The bus 106 has a pro-punched hole 122 at the position on the bus where the electrical connection is to be made. The conductor end 121 is placed in hole 122 of the bus 106 and the junction is soldered. The soldered junction 123 is desirably covered with a small amount or epoxy or ocher adhesive ply 104 and then the outer ply 102 to water seal the area. A strain relief wire clamp 124 may be bonded or fastened to a bare area of the aircraft skin or the area for the fastener can be pre-cut from the electrically conductive ply 103 prior to installation.

The laminate 101 is applied and bonded to an aircraft part as described hereinbelow. The part is primed for application of the adhesive ply 104 and allowed to dry. The adhesive 104 is applied and while wet, the conductive ply 104 is placed into the uncured adhesive ply 105. In a preferred embodiment of the invention, when the aircraft part 100 has an aluminum exterior surface, it is cleaned, degreased and primed for the preferred epoxy adhesive at room temperature. The electrically conductive ply is placed in the uncured adhesive which may be brushed or sprayed on the surface of the aircraft part to a thickness of less than 0.001 inches. The electrically conductive ply is pre-cut to fit the surface to be coated and is quite pliable to fit over curved surfaces. The edge bus 106 is pressed into the edges of the electrically conductive ply. The subassembly is allowed to cure for about 30 minutes. The overall thickness of the laminate is now 0.001 or less. During the bonding process, one or more temperature sensors are imbedded into the laminate with sensor wiring. Next the outer protective ply 102 is applied and allowed to cure.

The following is an example of the invention in practice. A 12 inch by 12 inch square of 0.040 gauge 6061 T3 aircraft aluminum was degreased and primed. After the prime coat was dry, a one part aluminized epoxy was applied at a thickness of less than 0.001 inch. An 11 inch by 11 inch piece of the preferred electrically conductive ply was applied to the uncured epoxy followed by two 11 inch long ½ inch wide strips of 0.0005 inches thick copper was applied to opposing edges of the laminate. After 30 minutes a coat of polyurethane was applied and the sample was allowed to cure for four hours. In a test, a block of dry ice was placed on the opposite side of the sample and atomized water was sprayed on the laminated surface. A layer of clear ice formed rapidly varying in thickness from 1/16" to ¼". The surface temperature measured $-40°$ F. Using a 110 VAC current source, a variable voltage transformer was used to apply 20 volts to the laminate. Within 3.5 minutes the ice was melted and the surface temperature measured 40° F.

On the leading edge of a wing, using the same technique as mentioned hereinabove, the enveloping of the laminate may be accomplished by folding over the laminate and adhering it to the understructure.

What is claimed:

1. An improved vehicle component surface portion, integrally bonded, laminate coating with enhanced ice prevention and de-icing capabilities comprising:
   (a) an adhesive ply first applied to said vehicle component surface portion in a liquid uncured state;
   (b) an electrically conductive, porous, pliable ply, composed of metal coated substrate fibers ranging in diameter from 4 to 100 microns and in length from 0.5" to continuous form, said electrically, conductive ply disposed in said adhesive ply while said adhesive ply is in its liquid uncured state, said conductive ply cut and sufficiently pliable to fit said surface portion in a contiguous, coextending manner therewith when disposed in and upon said adhesive ply, said adhesive ply dispersing between and around the substrate fibers of said porous, electrically conductive ply such that said adhesive ply integrally envelops said electrically conductive ply, whereby said electrically conductive ply is retained in its contiguous and coextending manner by said adhesive ply until said adhesive ply cures;
   (c) means adapted to provide electrical energy to said electrically conductive ply, said electrically conductive ply having a surface resistivity in the range between 0.1 ohm and 500 ohms per unit square, whereby the temperature of the improved vehicle component surface portion laminate coating can be changed upon application of said electrical energy; and
   (d) an outer ply applied in a liquid state to cover the adhesive and electrically conductive plies in place on said surface portion, said adhesive and outer plies curing in place on said vehicle component surface portion to integrally form said laminate coating of said vehicle component surface portion, said outer ply when cured, providing a waterproof, resistant to abrasion and penetration, and hardened coating, for protecting the underlying, electrically conductive ply from damage.

2. The laminate coating as claimed in claim 1 wherein an electrically insulating ply is disposed in said adhesive ply, between said electrically conductive ply and said vehicle component surface, when said adhesive ply is in a liquid state,
   said insulating ply having sufficient porosity to permit said adhesive ply in a liquid state to pass therethrough so as to envelop said insulating and electrically conductive plies.

3. The laminate coating as claimed in claim 1 wherein said vehicle component surface portion is an aircraft fuselage, wings or tail assembly.

4. The laminate coating as claimed in claim 1 wherein said outer ply is a polyurethane topcoat.

5. The laminate coating as claimed in claim 1 wherein said electrically conductive ply is a non-woven matrix of graphite fibers coated with nickel with an average fiber diameter of 12 microns and length of one inch.

6. The laminate coating as claimed in claim 1 wherein said adhesive ply is an epoxy adhesive.

7. The laminate coating as claimed in claim 1 wherein said means adapted to provide electrical energy includes a means to detect the temperature at one or more points in the laminate coating.

8. The laminate coating as claimed in claim 1 wherein said electrically conductive ply is a blend of fiber(s) with various conductivities so as to produce a desired level of conductivity in the conductive ply.

9. The laminate coating as claimed in claim 1 wherein said laminate coating envelops a part of said vehicle surface portion.

10. The laminate coating as claimed in claim 1 wherein said means adapted to provide electrical energy include an integrated control means adapted to provide selected amounts of electrical energy to the electrically conductive ply of said laminate coating to raise the temperature of said laminate coating to selected ranges.

11. The laminate coating as claimed in claim 1 wherein said laminate coating includes an alarm means to detect temperature at 32 degrees F. and below.

12. The laminate coating as claimed in claim 2, wherein the insulating ply has a thickness in the range between 10 and 100 microns.

13. The laminate coating as claimed in claim 1 wherein the metal coated substrate fibers are nickel coated, carbon fibers,
   wherein the percent composition by weight of the nickel and graphite is in the range of 5% to 95% of each component.

14. The laminate coating as claimed in claim 13 wherein the percent composition by weight of the nickel and graphite is approximately 50% each.

15. The laminate coating as claimed in claim 13 wherein an electrically insulating ply is disposed in said adhesive ply, between said electrically conductive ply and said vehicle component surface, when said adhesive ply is in a liquid state,
   said insulating ply having sufficient porosity to permit said adhesive ply in a liquid state to pass therethrough so as to envelop said insulating and electrically conductive plies.

16. The laminate coating as claimed in claim 13 wherein said vehicle component surface portion is an aircraft fuselage, wings or tail assembly.

17. The laminate coating as claimed in claim 13 wherein the outer ply is a polyurethane topcoat.

18. The laminate coating as claimed in claim 13 wherein the electrically conductive ply is a non-woven matrix of graphite fibers coated with nickel with an average fiber diameter of 12 microns and length of one inch.

19. The laminate coating as claimed in claim 13 wherein said adhesive ply is an epoxy adhesive.

20. The laminate coating as claimed in claim 13 wherein said means adapted to provide electrical energy includes a means to detect the temperature at one or more points in the laminate coating.

21. The laminate coating as claimed in claim 13 wherein said electrically conductive ply is a blend of fiber(s) with various conductivities so as to produce a desired level of conductivity in the conductive ply.

22. The laminate coating as claimed in claim 13 wherein said laminate coating envelops a part of said vehicle surface portion.

23. The laminate coating as claimed in claim 13 wherein said means adapted to provide electrical energy include an integrated control means adapted to provide selected amounts of electrical energy to the electrically conductive ply of said laminate coating to raise the temperature of said laminate coating to selected ranges.

24. The laminate coating as claimed in claim 13 wherein said laminate coating includes an alarm means to detect temperature at 32 degrees F. and below.

25. The laminate coating claimed in claim 15, wherein the insulating ply has a thickness in the range between 10 and 100 microns.

* * * * *

UNITED STATES PATENT AND TRADEMARK OFFICE
CERTIFICATE OF CORRECTION

PATENT NO. : 5,344,696
DATED : September 6, 1994
INVENTOR(S) : Otis h. Hastings; Otis M. Hastings It is certified that error appears in the above-indentified patent and that said Letters Patent is hereby corrected as shown below:

At Column 1, line 15 , change the word "or" to --of--.
At Column 1, line 66, change the word "Raid" to --and--.
At Column 5, line 20, change the word "members" to --fibers--.
At Column 5, line 30, change the word "or" to -- of--.

At Column 7, line 8, change the word "s table" to --stable--.
At Column 7, line 15, insert the word "--is--, before the word "chosen".
At Column 7, line 26, change the word "slop" to --stop--.
At Column 7, line 27, change the word "or" to --of--.
At Column 8, line 44, change the word "pro-punched" to --pre-punched--.
At Column 8, line 48, change the word "ocher" to --other--.

Signed and Sealed this

Eleventh Day of April, 1995

*Attest:*

*Attesting Officer*

BRUCE LEHMAN

*Commissioner of Patents and Trademarks*